(12) United States Patent
Mott

(10) Patent No.: US 7,025,638 B2
(45) Date of Patent: *Apr. 11, 2006

(54) OVERMOLDED ELECTRICAL CONNECTOR

(75) Inventor: Allen Leo Mott, Livonia, MI (US)

(73) Assignee: FCI Americas Technology, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/186,198

(22) Filed: Jul. 20, 2005

(65) Prior Publication Data

US 2005/0255755 A1   Nov. 17, 2005

Related U.S. Application Data

(63) Continuation of application No. 10/805,763, filed on Mar. 22, 2004, now Pat. No. 6,966,800.

(51) Int. Cl.
*H01R 9/22* (2006.01)
*H01R 13/405* (2006.01)

(52) U.S. Cl. ...................... 439/722; 439/736

(58) Field of Classification Search ............... 439/722, 439/736, 931; 264/255, 259; 29/841; 174/522
See application file for complete search history.

(56) References Cited

U.S. PATENT DOCUMENTS

| | | | |
|---|---|---|---|
| 3,518,168 A | 6/1970 | Byler et al. | 204/32 |
| 4,003,760 A | 1/1977 | Labenski et al. | 148/6.2 |
| 4,253,231 A | 3/1981 | Nouet | 29/602 |
| 4,541,980 A | 9/1985 | Kiersarsky et al. | 264/174 |
| 4,874,324 A | 10/1989 | Andersen et al. | 439/271 |
| 5,022,968 A | 6/1991 | Lin et al. | 204/28 |
| 5,108,317 A | 4/1992 | Beinhaur et al. | 439/736 |
| 5,141,454 A | 8/1992 | Garrett et al. | 439/620 |
| 5,161,009 A | 11/1992 | Tanoi et al. | 359/82 |
| 5,246,391 A | 9/1993 | Seidler | 439/876 |
| 5,343,073 A | 8/1994 | Parthasarathi et al. | 257/666 |
| 5,728,285 A | 3/1998 | Mathew | 205/182 |
| 5,779,505 A * | 7/1998 | Yagi et al. | 439/736 |
| 5,885,108 A | 3/1999 | Gerrans, Jr. | 439/606 |
| 5,919,517 A | 7/1999 | Levendusky et al. | 427/211 |
| 6,478,613 B1 | 11/2002 | Zoell et al. | 439/519 |
| 6,524,698 B1 | 2/2003 | Schmoock | 428/336 |
| 6,807,731 B1 | 10/2004 | Brandenburg et al. | 29/841 |
| 6,821,146 B1 | 11/2004 | Tolmie | 439/577 |
| 6,821,162 B1 | 11/2004 | Mott et al. | 439/722 |

OTHER PUBLICATIONS

"Investigation of a Novel Leadframe Treatment for 'Dry-Pack Free' Packaging", Charles Lee, et al.., Forty-Seventh Electronic Components & Technology Conference, May 1997, 12 pages.

* cited by examiner

*Primary Examiner*—Chandrika Prasad
(74) *Attorney, Agent, or Firm*—Harrington & Smith, LLP

(57) ABSTRACT

An electrical connector including an electrical contact and an overmolded housing. The electrical contact includes an electrically conductive substrate of an alloy material and at least one sealing coating on a first section of the substrate. The sealing coating includes chromium and/or zinc. The overmolded electrical connector housing is overmolded onto at least a portion of the first section on the sealing coating. The sealing coating prevents a passage from forming at a joint between the contact and the overmolded housing for preventing flow of vapor and/or liquid and/or other fluid through the joint.

18 Claims, 3 Drawing Sheets

OVERMOLDED ELECTRICAL CONNECTOR

CROSS REFERENCE TO RELATED APPLICATION

This is a continuation patent application of U.S. patent application Ser. No. 10/805,763 filed Mar. 22, 2004, now U.S. Patent No. 6,966,800.

BACKGROUND OF THE INVENTION

1. Field of the Invention

The present invention relates to electrical connectors and, more particularly, to an electrical connector having an overmolded housing.

2. Brief Description of Prior Developments

One method of manufacturing electrical enclosures for use in a harsh environment, particularly automotive, is to overmold metal electrical current carrying elements, generally referred to as terminals, with one of any number of engineering resins; thus producing an electrical enclosure with an integral electrical connector. Overmolding by itself does not, however, produce a perfectly sealed device. As the plastic cools and shrinks after molding, micro gaps can form between the metal and the plastic in which fluids can wick or leak. In cases where environmental sealing is required, such as for a fuel tank electrical connector, expensive secondary operations, such as potting or gaskets, are necessitated.

A process called an A2 treatment has been developed as a dry-pack free solution for moisture sensitive plastic surface mount packages. Unlike most lead frame surface treatments, A2 is an ultra-thin inorganic coating which is electro-deposited on metallic surfaces to provide coupling for polymetric adhesion. U.S. Pat. No. 5,343,073 discloses lead frames in integrated circuit (IC) packages having chromium and zinc alloy coatings. U.S. Pat. No. 5,728,285 discloses an A2 treatment, but in a semiconductor on a circuit board as a protective coating; not in an electrical connector and not to provide a sealing function.

A method for improving the adhesion of metal to plastic is desired to improve sealing and help the device meet stringent government regulations for hydrocarbon vapor emissions. A treatment is desired to promote the adhesion of molding resins to metal electrical current carrying elements in an overmolded electrical connector. There is an expectation that increased adhesion will greatly improve sealing. In the case of a fuel flange, permeation of hydrocarbon vapors to the environment are desired to be reduced. In the case of overmolded electrical connectors generally, expensive secondary potting operations are desired to be eliminated.

SUMMARY OF THE INVENTION

In accordance with one aspect of the present invention, an electrical connector is provided including an electrical contact and an overmolded housing. The electrical contact includes an electrically conductive substrate of an alloy material and at least one sealing coating on a first section of the substrate. The sealing coating includes chromium and/or zinc. The overmolded electrical connector housing is overmolded onto at least a portion of the first section on the sealing coating. The sealing coating prevents a passage from forming at a joint between the contact and the overmolded housing for preventing flow of vapor through the joint.

In accordance with another aspect of the present invention, a fuel tank electrical connector is provided comprising a plurality of electrical contacts, each electrical contact comprising a substrate member comprised of a copper alloy, a first section having a sealing coating located on the substrate, and at least one second section having a tin coating located on the substrate. The at least one second section comprises a contact area of the contact adapted to make electrical connection with a second electrical connector. The sealing coating comprises an electro-deposited inorganic coating. The overmolded electrical connector housing has been overmolded onto at least a portion of the first sections. The sealing coating is located at junctions between the contacts and the overmolded housing. At least a portion of each of the second sections is located spaced from the junctions for electrical contact with the second electrical connector. The housing is adapted to be connected to a fuel tank housing.

In accordance with one method of the present invention, a method of manufacturing an electrical connector is provided comprising steps of electro-depositing an inorganic coating to a first section of a plurality of electrical contacts; plating second sections of the contacts with tin; and overmolding a polymer housing onto the contacts. The housing is overmolded onto the contacts with the inorganic coating at junctions between the housing and the contacts to form a seal between the housing and the contacts at the junctions. The inorganic coating provides adhesion and sealing as the housing cools after overmolded to thereby prevent passages or cracks from forming in the overmolded housing at the junctions.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
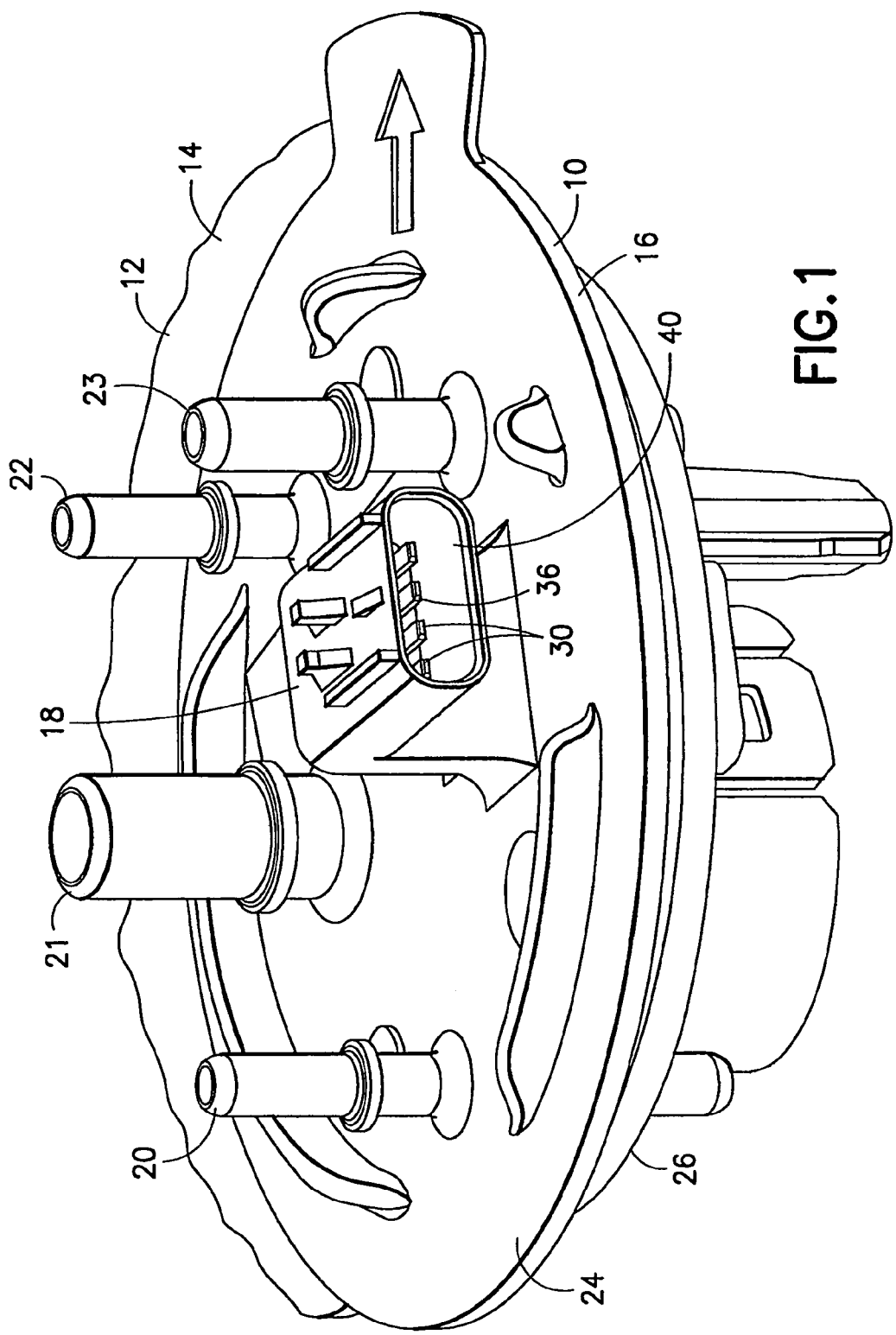
FIG. 1 is a perspective view of a fuel tank flange comprising an electrical connector incorporating features of the present invention wish a partial, cutaway section of a fuel tank housing.

Referring to FIG. 1, there is shown a perspective view of a flange unit 10 incorporating features of the present invention shown attached to a housing 12 of a fuel tank 14. Although the present invention will be described with reference to the exemplary embodiment shown in the drawings, it should be understood that the present invention can be embodied in many alternate forms of embodiments. In addition, any suitable size, shape or type of elements or materials could be used. The present invention is particularly adapted for use with an automobile fuel tank. Although features of the present invention are being described with reference to use with a fuel tank, features of the present invention could be used with any suitable type of container adapted to contain a liquid or gas, or at any suitable barrier between two areas intended to be maintained as separate.

The flange unit 10 generally comprises a frame 16, and an electrical connector section 18. The electrical connector section 18 forms an electrical connector with the frame 16 through the flange unit 10. The frame 16, in this embodiment, forms part of the electrical connector and, more specifically, forms part of the housing of the electrical connector. The frame 16 is preferably comprised of a one-piece molded plastic or polymer member. The frame 16 comprises tube sections 21–23. The tube sections 21–23 extend between and from a first side 24 of the frame and an opposite second side 26 of the frame. Tube sections 21–23 provide conduits through the frame 16 between the first side 24 and the second side 26. The tube sections 20–23 also form mounting flanges for attachment of fluid/vapor/air conduits or tubes (not shown) thereto.

Figure 2:
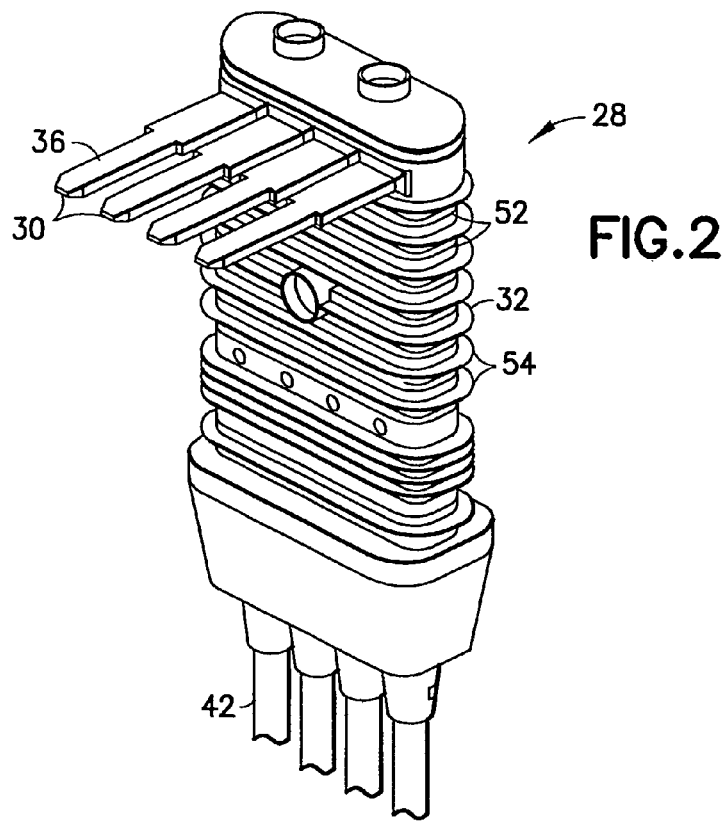
FIG. 2 is a perspective view of an electrical connector subassembly used in the fuel tank flange shown in FIG. 1.

Referring also to FIG. 2, the electrical connector section 18 comprises an electrical connector subassembly 28. The frame 16 is preferably overmolded onto the subassembly 28. The subassembly 28 generally comprises electrical contacts 30 and a subassembly housing 32. The electrical connector subassembly 28 comprises four of the electrical contacts 30. However, in alternate embodiments, more or less than four contacts could be provided. In the embodiment shown, the electrical connector section 18 has an electrical connector housing formed by a portion of the frame 16 and the subassembly housing 32.

Figure 3:
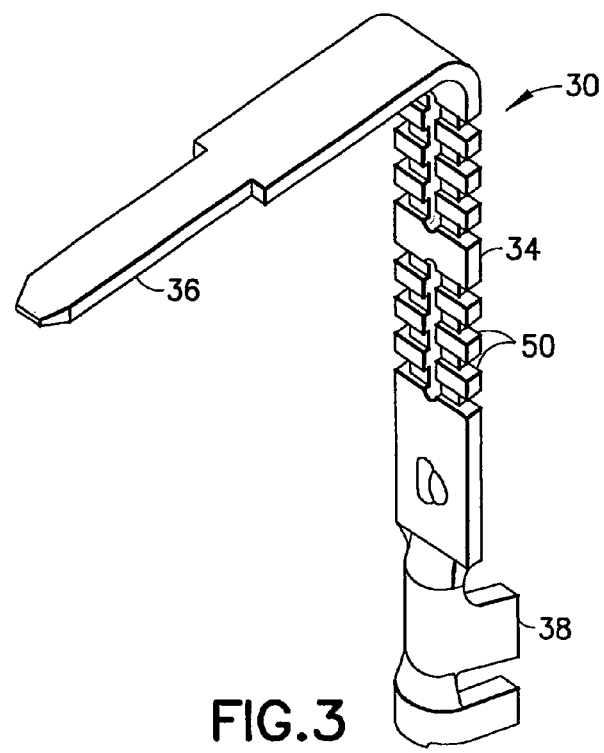
FIG. 3 is a perspective view of one of the electrical contacts used in the electrical connector subassembly shown in FIG. 2.

Referring also to FIG. 3, one of the electrical contacts 30 is shown. In this embodiment the electrical connector 30 comprises a first middle section 34 and two second connection sections 36, 38. The second connection section 36 comprises a male contact section which is adapted to be removably connected to a female contact section of a contact in a mating electrical connector (not shown). The mating electrical connector (not shown) is adapted to be inserted into a connector receiving area 40 (see FIG. 1) formed by the frame 16 at the electrical connector section 18. The second connection sections 36 extend into the connector receiving area 40 as shown in FIG. 1. The second connection section 38 is located on the opposite side of the first middle section 34 from the second connection section 36. The second connection section 38 is adapted to be crimped onto an electrical conductor of an electrical wire 42 (see FIG. 2). In this embodiment, the electrical contact 30 comprises a general L shape. However, in alternate embodiments, the electrical contacts could comprise any suitable type of shape.

Figure 4:
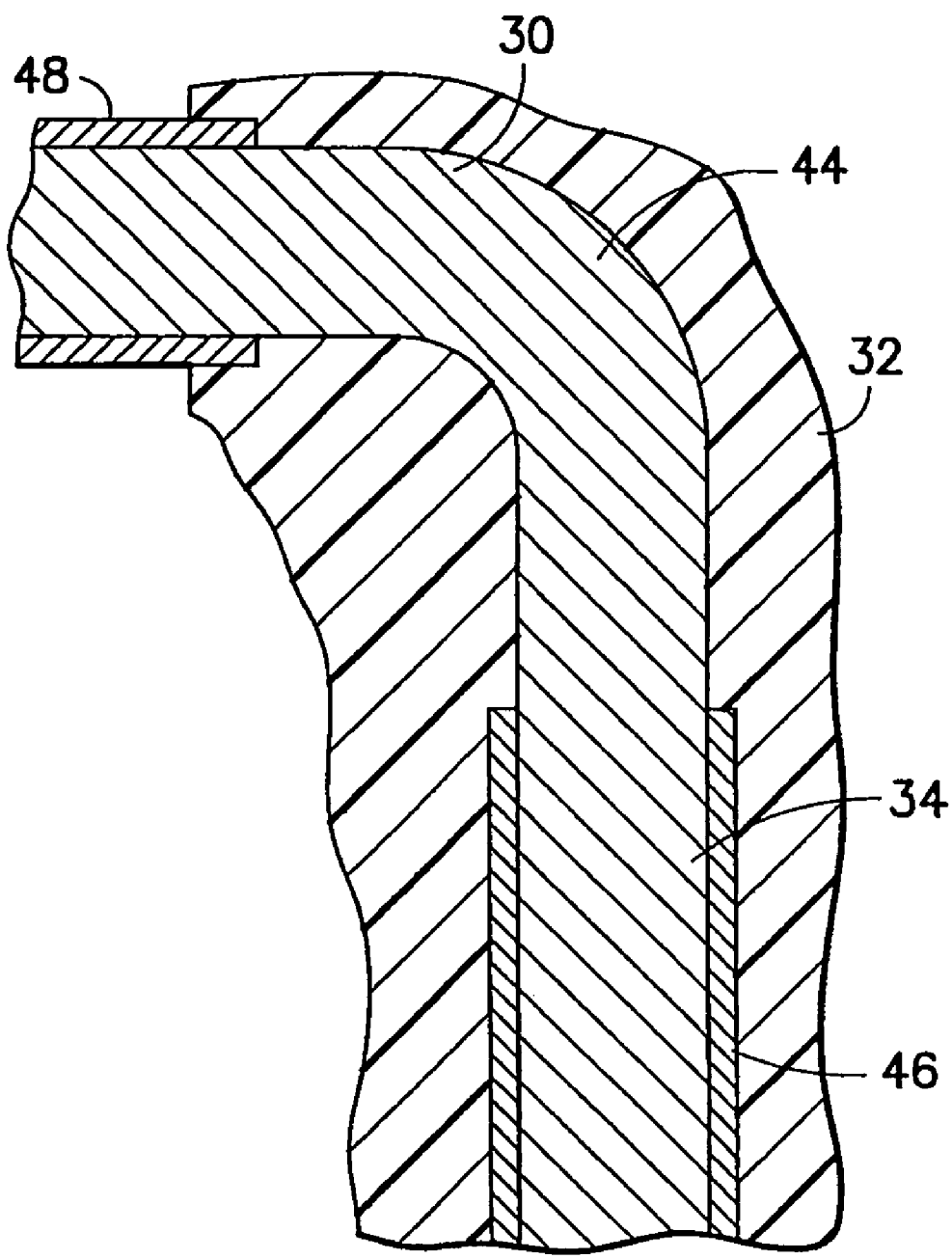
FIG. 4 is a partial cross sectional view of a portion of the electrical connector subassembly shown in FIG. 2.

Referring also to FIG. 4, each electrical contact 30 generally comprises a substrate 44, a sealing coating 46, and a contact section coating 48. The substrate 44 comprises an electrically conductive substrate, such as a metal substrate comprised of a copper alloy. In a preferred embodiment, the substrate comprises CA19700 copper alloy. However, in alternate embodiments, any suitable type of electrically conductive material could be used for the conductive substrate.

The sealing coating 46 is located on the first middle section 34. In a preferred embodiment, the coating 46 is electro-deposited on the first section 34. The coating 46 preferably comprises an A2 treatment of chromium and/or zinc. In one type of preferred embodiment, the coating 46 comprises chromium and zinc. In particular, the coating 46 is preferably the same as the chromium and zinc outer layer described in U.S. Pat. No. 5,343,073 which is hereby incorporated by reference in its entirety. The A2 treatment is an ultra-thin inorganic coating which is electro-deposited on metallic surfaces to provide coupling for polymetric adhesion. It has been discovered that, besides providing for better coupling for polymetric adhesion, the A2 treatment can also provide an enhanced sealing function between an electrical contact and an overmolded polymer housing. In this embodiment, the coating 46 is applied directly to the substrate 44, such as by electroplating, before the subassembly housing 32 is overmolded onto the contacts 30.

U.S. Pat. No. 5,343,073 merely uses the A2 treatment for adhesion. U.S. Pat. No. 5,728,285 merely uses the A2 treatment as a protective coating. It has been discovered that the A2 treatment can be used for providing an enhanced sealing function at a sealing junction to increase the sealing efficiency between electrical contacts and an overmolded electrical connector housing by preventing cracks or gaps from forming in the overmolded housing when the housing cools after overmolding.

The coating 46 preferably contains chromium, zinc, or a mixture thereof. Most preferred is a mixture of chromium and zinc. The coating is thin, preferably on the order of from about 10 to about 1000 angstroms. More preferably, the thickness is from about 10 to about 100 angstroms and most preferably, from about 40 to about 80 angstroms. The coating 46 provides oxidation resistance and improves adhesion to a polymer resin without significantly reducing the strength of a wire bond or detrimentally affecting subsequent assembly operations. The coating 46 may be applied by any suitable technique such as immersion plating, electrolytic plating or cladding.

The preferred coating may be deposited by any conventional method and may be a co-deposited layer or sequentially deposited layers of chromium and zinc. One preferred method of depositing the coating is disclosed in U.S. Pat. No. 5,022,968 which is incorporated herein by reference in its entirety. The patent discloses a coating layer containing chromium and zinc for anti-tarnish purposes. The coating layer is electrolytically deposited from a basic aqueous electrolyte containing hydroxide ions, from about 0.07 grams per liter to about 7 g/l zinc ions and from about 0.1 g/l to about 100 g/l of a water soluble hexavalent chromium salt where the concentration of either the zinc ions or the chromium (VI) ions or both is less than 1.0 g/l. The coating layer has a zinc-to-chromium ratio in excess of about 4:1. One analyzed sample had the composition: 5 atomic percent Cr, 21% Zn, 56% O, 16% C and 1% Cu.

The substrate housing 32 is preferably comprised of acetal. Acetal, also known as polyacetal, polyoxymethylene (POM), or polyformaldehyde, is a high performance engineering polymer. Because of its high strength, modulus, and resistance to impact and fatigue, it is used as a weight-saving metal replacement. Acetal, first developed in the late 1950s, is available as a homopolymer (such as DuPont Delrin®) or copolymer (such as Ticona's Celcon®). In a preferred embodiment, the housing 32 is comprised of a homopolymer acetal such as DELRIN® 100P sold by Dupont.

The subassembly housing 32 comprises an overmolded housing. More specifically, the subassembly housing 32 is overmolded onto the contacts 30. The contacts 30 are preferably attached to the conductors of the electrical wires 42, such as by crimping, before the subassembly housing 32 is overmolded onto the contacts. The subassembly housing 32 is preferably overmolded onto the wires 42 and their connection at the second connection sections 38. This provides an overmolded installation at the connection of the wires 42 with the contacts.

The second connection sections 36, 38, located at opposite ends of the contacts 30, have the contacts section coating 48 thereon. In a preferred embodiment, the contact section coating 48 comprises tin. The contact section coating 48 is preferably selectively deposited on the contacts 30 at only the second connection sections 36, 38. Tin is a relatively soft material. It will move such that oxides will crack during connection with mating electrical conductors to allow a good a electrical connection. Thus, a coating of tin on a contact is desirable at a connection area of the contact.

In the past, the electrical contacts were subjected to a hot tin dipped (HTD) which substantially covered the entire contact. This was a relatively inexpensive process to allow the contact areas to be covered with tin for good mating electrical conductor connection purposes. However, it has been discovered that overmolding a polymer housing onto a contact entirely coated with tin allows gaps or passages to be formed between the overmolded housing and the tin because of the soft nature of tin. In an alternate embodiment, a material other than tin could be used for the contact section coating.

With the present invention, the contact section coating 48 is not applied to the first middle section 34 of the contacts 30. As seen in FIG. 4, when the subassembly housing 32 is overmolded onto the contacts 30, the housing is overmolded onto the sealing coating 46 on the first section 34. The first section 34 comprises a plurality of grooves or notches 50. These grooves 50 are provided to establish a tortuous path between the overmolded housing 32 and the contact 30 along the first section 34. This tortuous path helps to form a seal between the contacts 30 and the housing 32 to prevent liquid or vapor from traveling between the junctions of the overmolded housing with the contacts. The sealing coating 46 is located at the junctions.

After the housing 32 is overmolded onto the contacts 30, the housing 32 will cool. In the past, during this cooling period, cracks and gaps would form in the housing 32 at the junction with the contacts. However, it has been discovered that application of the sealing coating 46 substantially prevents these cracks and gaps from forming when the overmolded housing 32 cools. Thus, an enhanced seal is provided at the junction between the housing and the contacts at the sealing coating 46.

Providing a seal between the contacts and the overmolded housing is particularly desirable for an electrical connector such as used with an automobile fuel tank. The seal prevents fuel vapors from leaking out of the fuel tank through the electrical connector between the contacts and the electrical connector housing. With the use of this process, the addition of additional components, such as additional seal members or potting material, is no longer needed. The sealing function can be provided merely by the contacts 30 and the overmolded housing 32 without any additional components.

In the electrical connector subassembly 28 shown in FIG. 2, the exterior of the subassembly housing 32 comprises grooves 52 and ridges 54. The frame 16 is preferably overmolded onto the subassembly housing 32. The grooves 52 and ridges 54 provide a tortuous path between the frame 16 and the subassembly housing 32 to also prevent fuel vapors from traveling between the two members at the junction of the two members.

Generally, in one type of conventional fuel flange seal with an electrical connector which used a secondary operation of impregnation of adhesive to increase sealing, leak rates in the order of about $10^{-5}$ to about $10^{-6}$ cm$^3$/second were provided. Tests were conducted to determine the leak rate with the present invention. The testing equipment used a vacuum on one side of the sample and Helium at a pressure of about 2.35 psi on the other side of the sample. An O-ring seal was provided on the sample with the test fixture to seal the sample with the test fixture. The following chart shows the test results for 50 samples (numbered 1–50):

| Sample # | Over mold Shot | Over mold Cavity | Premold Shot | Premold Cavity | Leak Rate | Comments |
|---|---|---|---|---|---|---|
| 1 | 24 | 4B | 2 | A4 | 6.8E – 06 | |
| 2 | 25 | 1B | 1 | A6 | 9.2E – 06 | |
| 3 | 25 | 2B | 1 | A7 | 7.3E – 06 | |
| 4 | 23 | 1B | 4 | A1 | 9.2E – 06 | |
| 5 | 24 | 3B | 1 | A8 | 7.3E – 06 | |
| 6 | 17 | 1B | 3 | A6 | 7.3E – 06 | |
| 7 | 18 | 3B | 3 | A8 | 1.1E – 05 | |
| 8 | 19 | 1B | 5 | A8 | 4.9E – 06 | Flaw on Sealing surface -A- |
| 9 | 22 | 3B | 4 | A4 | 1.0E – 05 | |
| 10 | 20 | 4B | 4 | A3 | 1.1E – 05 | |
| 11 | 16 | 3B | 6 | A3 | 8.5E – 06 | Started using available rubber caps (All but one) |
| 12 | 18 | 4B | 2 | A1 | 9.3E – 06 | |
| 13 | 19 | 2B | 5 | A7 | 1.2E – 05 | |
| 14 | 21 | 1B | 2 | A2 | 8.5E – 06 | Switched back to Production caps |
| 15 | 22 | 4B | 4 | A2 | 1.2E – 05 | |
| 16 | 23 | 2B | 3 | A5 | 8.6E – 06 | |
| 17 | 21 | 2B | 2 | A3 | 1.2E – 05 | |
| 18 | 20 | 3B | 5 | A5 | 1.0E – 05 | |
| 19 | 17 | 2B | 3 | A7 | 1.0E – 05 | |
| 20 | 16 | 4B | 5 | A6 | 1.1E – 05 | |
| 21 | 6 | 2B | 6 | A6 | 7.5E – 06 | |
| 22 | 6 | 1B | 6?9 | A8 | 7.3E – 06 | |
| 23 | 10 | 3B | 9 | A7 | 5.0E – 06 | |
| 24 | 11 | 2B | 7 | A5 | 1.4E – 05 | |
| 25 | 8 | 3B | 9 | A1 | 7.3E – 06 | |
| 26 | 10 | 4B | 8 | A2 | 8.4E – 06 | |
| 27 | 11 | 1B | 9 | A3 | 7.5E – 06 | |
| 28 | 12 | 4B | 8 | A4 | 6.6E – 06 | |
| 29 | 12 | 3B | 8 | A1 | 3.9E – 06 | |
| 30 | 14 | 4B | 7 | A8 | 7.6E – 06 | |
| 31 | 13 | 2B | 7 | A7 | 7.0E – 06 | |
| 32 | 13 | 1B | 7 | A6 | 5.4E – 06 | |
| 33 | 14 | 3B | 6 | A4 | 2.0E – 06 | O-ring on tester cleaned with handkerchief |
| 34 | 15 | 1B | 6 | A2 | 3.7E – 06 | |
| 35 | 15 | 2B | 6 | A1 | 4.5E – 06 | |
| 36 | 1 | 2B | 12 | A5 | 2.6E – 06 | |
| 37 | 7 | 1B | 10 | A6 | 5.7E – 06 | |
| 38 | 3 | 1B | 11 | A3 | 2.8E – 06 | Contamination in pre-mold near wire |
| 39 | 3 | 2B | 11 | A4 | 2.6E – 06 | |
| 40 | 2 | 4B | 12 | A7 | 6.4E – 06 | |
| 41 | 2 | 3B | 12 | A8 | 1.0E – 05 | After testing sample 41, O-ring on tester cleaned again with handkerchief |
| 42 | 4 | 3B | 11 | A1 | 2.5E – 07 | |
| 43 | 5 | 2B | 10 | A7 | 1.2E – 07 | |
| 44 | 7 | 2B | 9 | A5 | 1.1E – 07 | |
| 45 | 8 | 4B | 9 | A4 | 3.5E – 07 | |
| 46 | 6 | 3B | 10 | A5 | 7.7E – 07 | |
| 47 | 6 | 4B | 10 | A8 | 4.0E – 07 | |
| 48 | 5 | 1B | 9 | A2 | 4.2E – 07 | |
| 49 | 4 | 4B | 11 | A2 | 4.7E – 07 | |
| 50 | 1 | 1B | 12 | A6 | 5.5E – 07 | |
| Statistics | | | | | | |
| Average | | | | | 6.3E – 06 | |
| Max | | | | | 1.4E – 05 | |
| Min | | | | | 1.1E – 07 | |
| Mean | | | | | 7.1E – 06 | |
| Sigma | | | | | 3.9E – 06 | |
| Mean + 3 Sigma | | | | | 1.9E – 05 | 1.9E – 05 |

The sample number is an identification number for the sample (50 samples were tested). The overmold shot is a part designation number for the mold used to form the overmold portion of the flange unit. Each overmold mold has multiple cavities for forming multiple flange units in one molding shot process. The overmold cavity identifies the cavity of the overmold shot from which the sample was taken from. The premold shot is a part designation number for a mold used to form the premold portion of the flange unit. Each premold mold has multiple cavities. The premold cavity designated the cavity of the premold shot from which the premold portion was taken. The leak rate is in $cm^3$/second.

As can be seen in looking at the leak rates of samples 1–41, the leak rate is about the same as a convention fuel flange which used a secondary impregnation operation to seal the flange; about $10^{-5}$–$10^{-6}$ $cm^3$/second. However, the present invention can provide the same sealing capability without the need to perform a secondary sealing operation. In addition, after cleaning the O-ring on the tester after sample 41, it was noticed that lower leak rates were occurring; in the order to about $10^{-7}$ $cm^3$/second. It is believed that a speck of dust may have been on the O-ring seal during the testing of samples 1–41 and, that the use of the present invention can provide a leak rate in the order of about $10^{-6}$–$10^{-7}$ $cm^3$/second. This will allow connectors or electronic modules incorporating features of the present invention to be used to meet more stringent environmental specifications expected to be enacted in the future, such as fuel tank hydrocarbon emissions.

It should be noted that features of the present invention can be used with any electronic module that needs to be environmentally sealed and, the present invention can do so without the need for potting material. It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An electrical connector comprising:
    an electrical contact comprising an electrically conductive substrate and at least one sealing coating on a first section of the substrate, wherein the sealing coating comprises an inorganic material; and
    an overmolded electrical connector housing which has been overmolded onto at least a portion of the first section at the sealing coating.

2. An electrical connector as in claim 1 wherein the sealing coating is adapted to prevent a passage from forming at a joint between the contact and the overmolded housing for preventing flow of vapor through the joint.

3. An electrical connector as in claim 1 wherein the conductive substrate comprises a copper alloy.

4. An electrical connector as in claim 1 wherein the housing comprises acetal.

5. An electrical connector as in claim 1 wherein the sealing coating comprises an electro-deposited coating on the substrate.

6. An electrical connector as in claim 1 further comprising tin plated on at least one second section of the substrate.

7. An electrical connector as in claim 6 wherein the tin is not located between sealing coating and the substrate.

8. A fuel tank electrical connector comprising an electrical connector as in claim 1, wherein the housing is sized and shaped to be mounted to a fuel tank housing.

9. A fuel tank electrical connector comprising:
    a plurality of electrical contacts, each electrical contact comprising a substrate member, a first section having a sealing coating located on the substrate, and at least one second section having a conductive coating located on the substrate, wherein the at least one second section comprises a contact area of the contact adapted to make electrical connection with a second electrical connector, and wherein the sealing coating comprises an electro-deposited inorganic coating; and
    an overmolded electrical connector housing which has been overmolded onto at least a portion of the first section, wherein the sealing coating is located at junctions between the contacts and the overmolded housing, wherein at least a portion of each of the second sections is located spaced from the junctions for electrical contact with the second electrical connector, and wherein the housing is adapted to be connected to a fuel tank housing.

10. A fuel tank electrical connector as in claim 9 wherein the electro-deposited inorganic coating comprises at least one of chromium and zinc.

11. A fuel tank electrical connector as in claim 10 wherein the electro-deposited inorganic coating comprises both chromium and zinc.

12. A fuel tank electrical connector as in claim 9 wherein the housing comprises acetal.

13. A fuel tank electrical connector as in claim 9 wherein the wherein the conductive coating comprises tin which is not located between the sealing coating and the substrate.

14. A fuel tank electrical connector as in claim 9 wherein the wherein the conductive coating comprises tin which is selectively electroplated on the substrate.

15. A method of manufacturing an electrical connector comprising steps of:
    electra-depositing an inorganic coating to a first section of at least one electrical contact; and
    overmolding a polymer housing onto the at least one electrical contact, wherein the housing is overmolded onto the at least one contact with the inorganic coating at junctions between the housing and the at least one contact to form a seal between the housing and the at least one contact at the junctions, and wherein the inorganic coating provides adhesion and sealing as the housing cools after overmolded to thereby substantially prevent passages or cracks from forming in the overmolded housing at the junctions.

16. A method as in claim 15 wherein the inorganic coating comprises chromium or zinc.

17. A method as in claim 15 wherein the inorganic coating comprises both chromium and zinc.

18. A method as in claim 15 further comprising plating second sections of the at least one contact with tin, wherein tin is not located between the inorganic coatings and the substrates of the electrical contacts.

* * * * *